United States Patent [19]

Ciolli

[11] Patent Number: 5,483,835
[45] Date of Patent: Jan. 16, 1996

[54] OIL PRESSURE SENDER UNIT WITH REINFORCED DIAPHRAGM

[75] Inventor: Henry Ciolli, Clinton Township, Mich.

[73] Assignee: Saturn Electronics & Engineering, Inc., Rochester Hills, Mich.

[21] Appl. No.: 136,443

[22] Filed: Oct. 13, 1993

[51] Int. Cl.$^6$ ........................................... G01L 9/02
[52] U.S. Cl. ................................. 73/726; 73/725
[58] Field of Search ............................. 73/707, 116, 725; 338/39, 41

[56] References Cited

U.S. PATENT DOCUMENTS

| | | |
|---|---|---|
| 2,423,609 | 7/1947 | Middleton et al. . |
| 2,515,867 | 7/1950 | Fuller . |
| 2,911,606 | 11/1959 | Hoffman . |
| 3,069,645 | 12/1962 | Henke . |
| 3,098,209 | 7/1963 | Stevens . |
| 3,305,651 | 2/1967 | Palmerone . |
| 3,402,608 | 9/1968 | Nishigori ........................ 73/707 |
| 3,504,324 | 3/1970 | Creager . |
| 4,038,506 | 7/1977 | Filip . |
| 4,079,351 | 3/1978 | Levine . |
| 4,299,253 | 11/1981 | Burton ........................... 73/707 |
| 4,445,382 | 5/1984 | Reynolds et al. . |
| 4,449,112 | 5/1984 | Gould ............................ 338/39 |
| 4,449,113 | 5/1984 | Gould et al. . |
| 4,581,941 | 4/1986 | Obermann et al. . |
| 4,648,277 | 3/1987 | Obermann . |
| 4,805,460 | 2/1989 | Betterton et al. ............... 73/725 |
| 5,045,830 | 9/1991 | Shibazaki et al. ............... 338/41 |

*Primary Examiner*—Richard Chilcot
*Assistant Examiner*—Jewel V. Artis
*Attorney, Agent, or Firm*—Harness, Dickey & Pierce

[57] ABSTRACT

An oil pressure sender unit is disclosed which employs a two-part housing with a reinforced rubber diaphragm disposed between the two housing parts in order to isolate a pressurized oil cavity from a dry circuit cavity which contains the electrical components of the sender unit. In the preferred embodiment the reinforced diaphragm includes a peripheral lip which mates with a corresponding groove located within one part of the housing which is a metal base. The base has an axially extending inlet passage with a damper plug inserted therein which together defines a plurality of volume chambers that receive high pressurized pulsating oil at the inlet side and, because of its design, delivers a smooth flow of high pressurized oil to the underside of the diaphragm. This causes less wear on the electrical contacts that engage a two-sided circuit card which has a resistor circuit on one side and an on/off circuit on the opposing side. The resistor circuit produces an analog signal proportional to the sensed oil pressure, and employs a movable contact that is integral with a piston that rests upon the diaphragm. The on/off circuit includes a metal contact integral with the piston which is operable to engage a conductive material on the surface of a ceramic circuit card in order to complete a circuit and energize an auxiliary device. An alternative grooveless sender base and reinforced diaphragm is provided which is of lower cost than the above design.

20 Claims, 3 Drawing Sheets

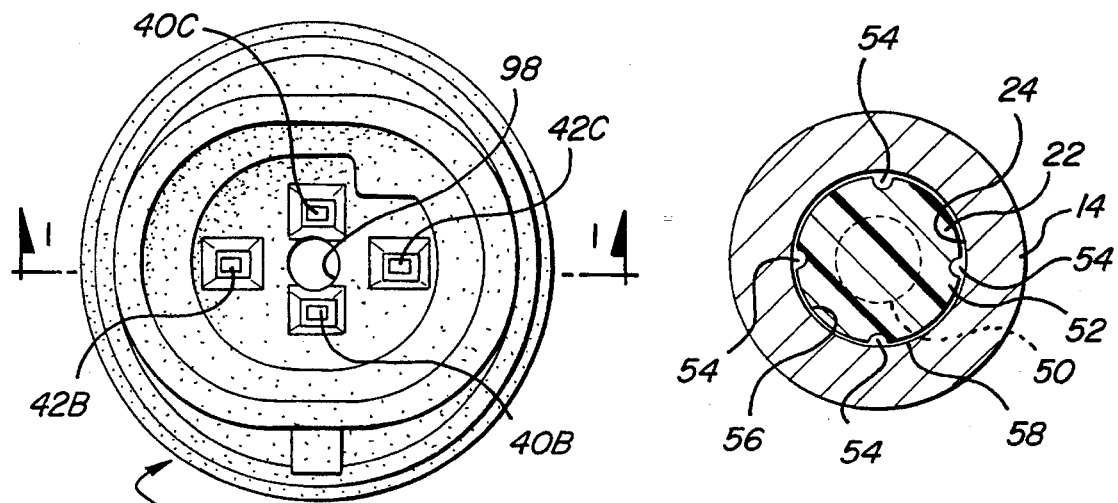
FIG-2
FIG-3
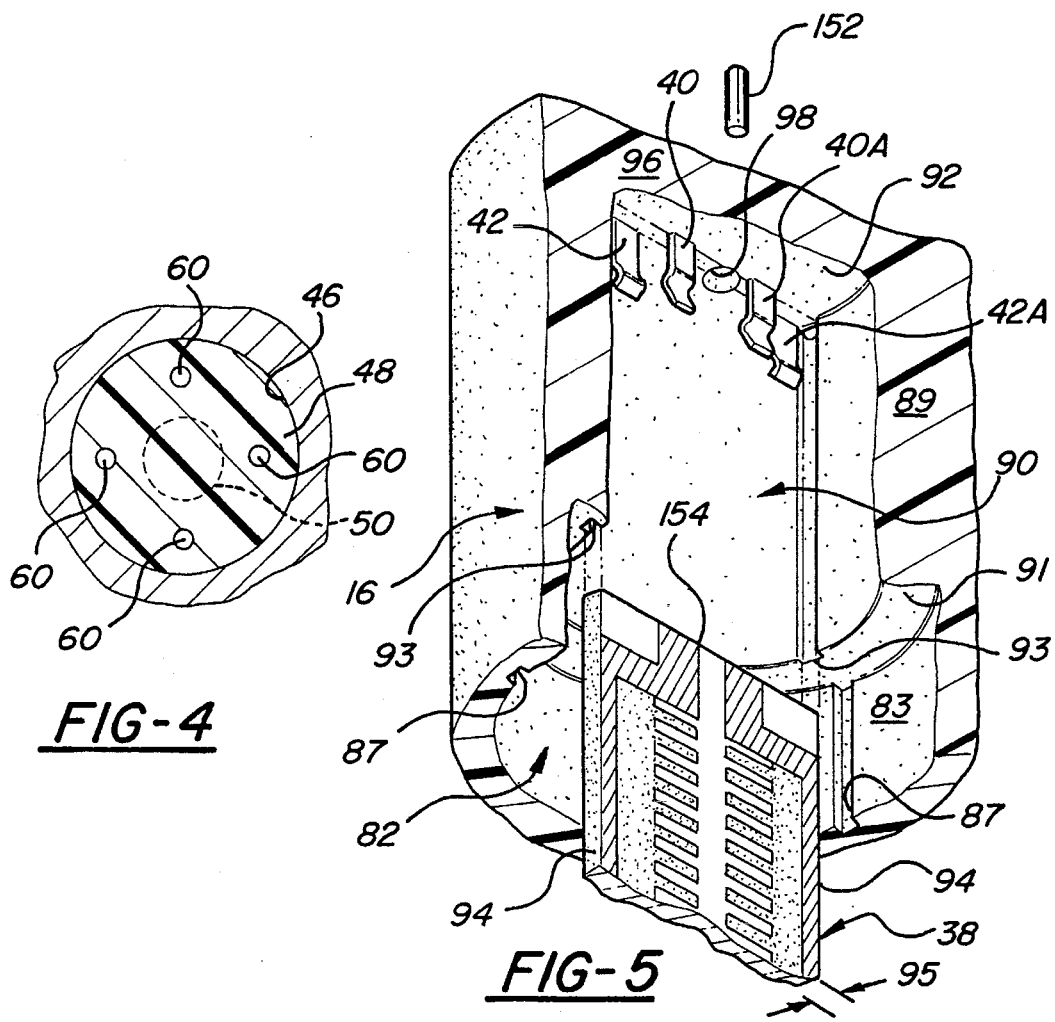
FIG-4
FIG-5

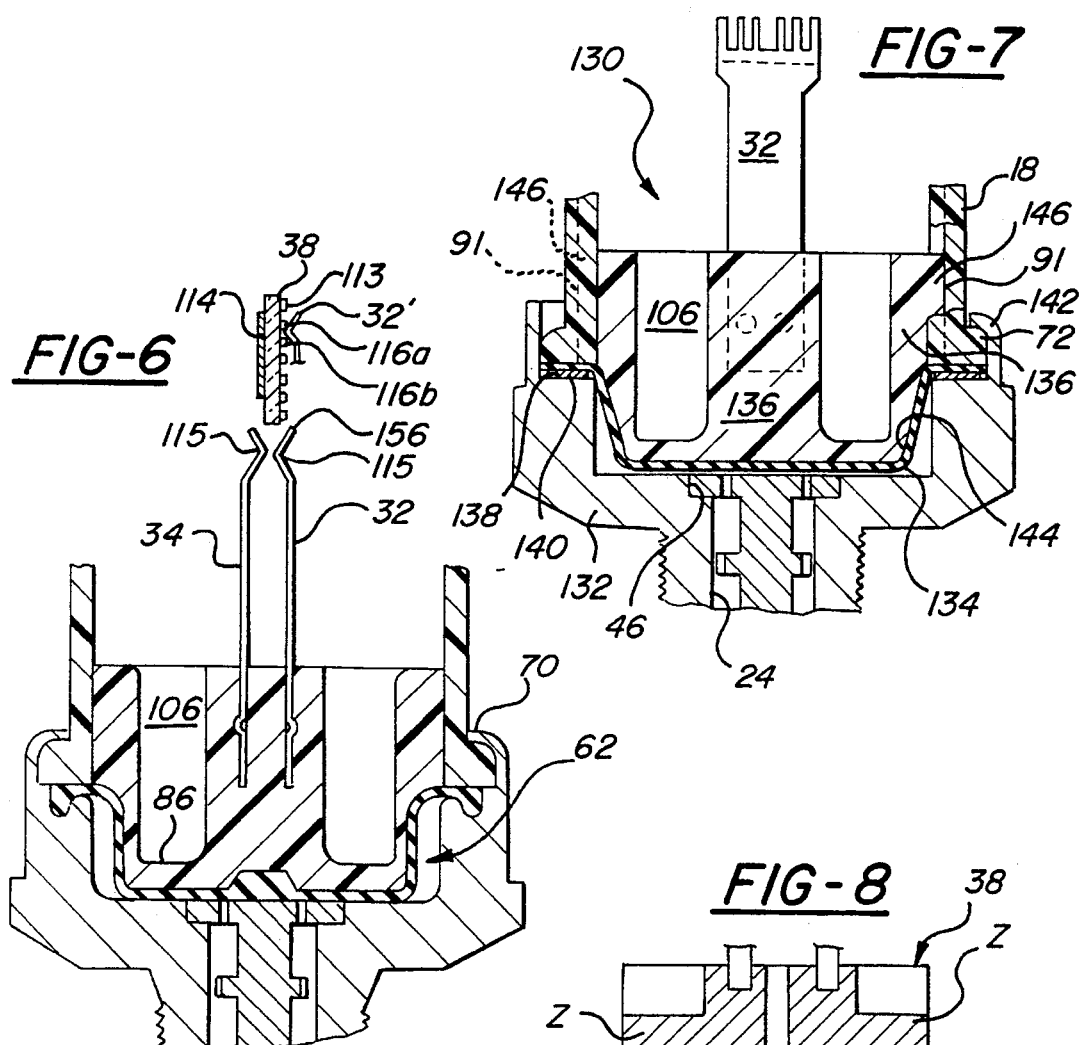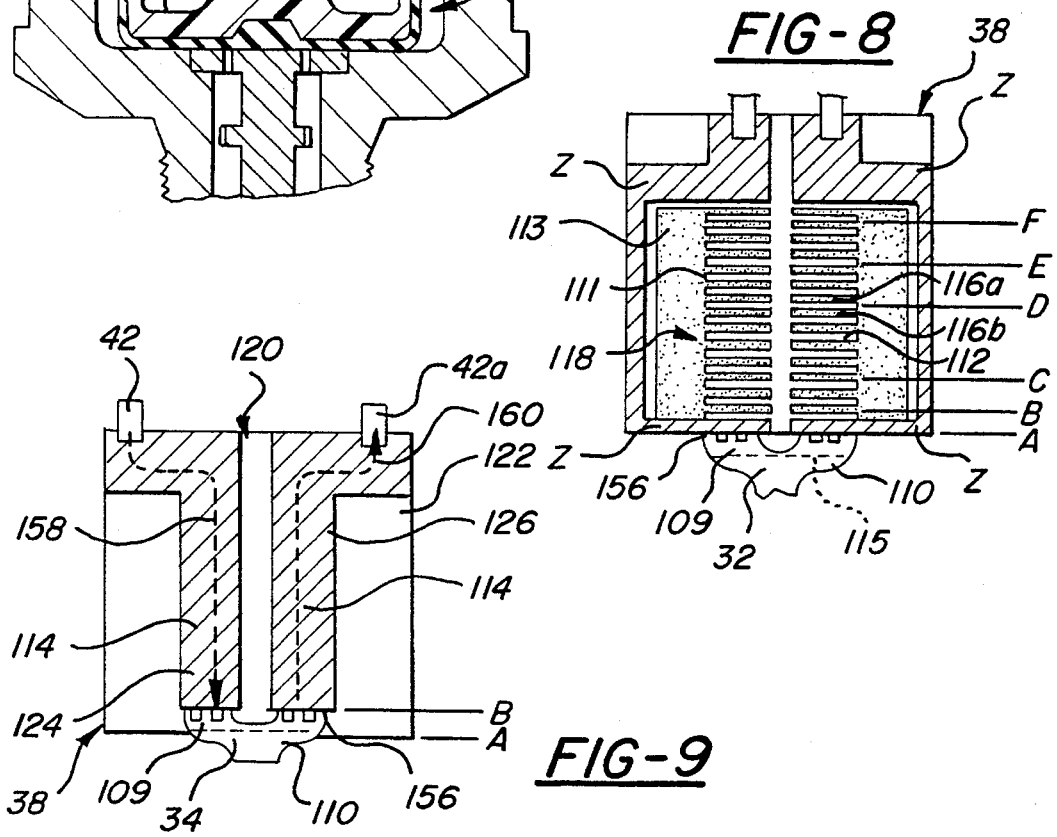

OIL PRESSURE SENDER UNIT WITH REINFORCED DIAPHRAGM

FIELD OF THE INVENTION

The present invention relates in general to fluid pressure sender units which sense fluid pressure and produce an analog signal which may be used to drive an oil pressure gauge and, more particularly, to automotive pressure sender units utilizing a reinforced rolling diaphragm structure that includes electrical contacts for engaging a circuit card having two electrical circuits.

DESCRIPTION OF RELATED ART

It is well known in the art to provide fluid pressure sender units for automotive applications in order to monitor the oil pressure of an automotive engine during operation. Such a device is essential in order to assure that the automotive engine continues to be properly lubricated during its operation. Typically, an oil pressure sender unit is threaded to a port located within an engine block and is generally connected electrically in series to an oil pressure gauge by conventional wiring. As the engine operates and circulates oil, the oil pressure sender unit senses the oil pressure and transmits an electrical analog signal to the oil pressure gauge within the cabin of the vehicle in order to inform the driver of the engine's oil pressure. As the oil pressure changes during engine operation, the electrical resistance of the analog circuit of the oil pressure sender unit likewise changes and thus causes the gauge within the cabin of the vehicle to change accordingly.

There are a variety of types of oil pressure sender units and the discussion of these devices are clearly set out in Applicant's co-pending patent application entitled "Oil Pressure Sender Unit", Ser. No. 07/969,488, filed Oct. 30, 1992, which is hereby incorporated by reference. It is believed that the present invention is yet another improvement over the oil pressure sender unit disclosed in Applicant's co-pending patent application. Both inventions strive to overcome the problems set out by the prior art.

One of the disadvantages of the prior art oil pressure sender units is that their design inherently subjects the reciprocating diaphragm assembly and its connected electrical system to high frequency pulsations created by the operating engine. Each pulsation of oil causes the diaphragm to fluctuate which directly causes the electrical contacts to reciprocate and provide an analog signal representative of a variable resistor. Each time the electrical contacts reciprocate and make contact against the various electrical components, these internal reciprocating components tend to wear and thus decrease the efficiency and even the life of the oil pressure sender unit. Thus, it would be desirable to dampen and average the high frequency gear pump oil pulsations yet still provide an engine oil responsive pressure to the underside of the diaphragm.

Another disadvantage of the prior art oil pressure sender units is that they generally provide a contact that continuously engages the resistance or conductive material of a circuit which generally results in a build-up of foreign material on the contact. As the build-up continues to accumulate over the life of the oil pressure sender unit, the oil pressure gage becomes erratic and unreliable.

Yet another disadvantage of the prior art oil pressure sender units is that their diaphragm may prematurely fail when subjected to oil that is contaminated, i.e., oil that has metal shavings in it. The failure essentially is a tear in the diaphragm which results in oil entering into the dry circuit cavity and then shorting out the circuitry which, in turn, will cause faulty oil pressure gage readings. Also, if an auxiliary electrical circuit is also in use with the sender unit, the device that is energized by the auxiliary electrical circuit will become inoperative.

In light of the foregoing problems, a primary object of the present invention is to provide an oil pressure sender unit that utilizes a multiple-orifice damper plug which will not allow metal particles to enter the oil cavity of the sensor thus protecting the underside surface of the rolling diaphragm from exposure to large metal particles. In the event that small particles enter the oil pressure cavity, the cavity is large enough to render the particles ineffective. A related object of the present invention is to provide an oil pressure sender unit with a strong movable member, namely a reinforced rolling diaphragm, capable of being subjected to high pressures without failing.

Another object of the present invention is to provide a sealed oil pressure sender unit with a flexible movable member that provides intrinsic isolation of the internal electric circuit chamber of the sender unit from the chamber of the sender unit into which oil media flows so that electrical circuits on the dry side of the moveable member are not affected by oil.

Yet another object of the present invention is to provide an automotive oil sender unit which utilizes a sliding electrical contact assembly that has self-cleaning capabilities which virtually eliminates any problems associated with long-term contact build-up caused by repetitive sliding of a contact or wiper structure back and forth across a resistor or conductive element.

Still another object of the present invention is to provide an automotive oil pressure sender unit which is capable of dampening the oil pulsations generated by an automotive engine so that the internal components of the oil pressure sender unit modulates less frequently and thus provides for a smoother operating sender unit which enhances the overall life of the sender unit. A related object should be to provide a sender unit that produces a smoother analog output signal.

Another object of the present invention is to provide an automotive oil pressure sender unit which utilizes an electrical system which is operable to provide enhanced heat dissipation and thus maintain the proper operating temperature of the oil pressure sender unit. A related object would be to provide a sender unit that may be easily and accurately calibrated.

Also, another object of the present invention is to provide a design for an oil pressure sender unit where fewer parts are utilized, so that the overall structure is less expensive and simpler to fabricate, and more reliable in long-term operation.

SUMMARY OF THE INVENTION

In light of the foregoing problems there is provided a novel oil pressure sender unit to be used in automotive applications. According to one aspect of the present invention, an oil pressure sender unit is provided with a spring-loaded rolling diaphragm that defines an oil pressure cavity and a dry circuit cavity. The dry circuit cavity includes a circuit card connected to a series of electrical connectors and also a pair of metallic wipers structures that make contact with the circuit card and are connected to a piston that reciprocates. The circuit card has a variable resistor circuit on one side and a conventional on/off switch circuit on the opposite side whereby, once a minimum pressure level is detected, one of the wiper structures makes contact with the resistor circuit and produces an analog output signal to the oil pressure gage and the other wiper structure makes contact with the on/off circuit and produces a signal that energizes an auxiliary device such as a fuel pump.

The analog signal generated by the oil pressure sender unit has less frequency modulations because of the design of a novel damper plug which is press-fit into the inlet oil passageway which, together, defines volume chambers which moderates the high frequency pulsations generated by the engine, or in the alternative, an oil pump. This results in smoother inlet fluid pressure being delivered to the underside of the diaphragm which corresponds to smoother linear analog signals being output to the oil pressure gauge.

A preferred embodiment of the fluid pressure sender unit may be described as comprising: a base structure including a generally cylindrical base having an opened end and a closed end as well as a cylindrical interior chamber defined between the two ends, and an oil inlet chamber extending from the open end to the interior chamber; a damper plug positioned within the oil inlet chamber for regulating inlet oil pulsations; a rolling diaphragm centrally positioned within the interior chamber of the base structure; a piston structure having an axially extending central portion which includes a pair of wiper structures integral with said piston; a spring positioned within the interior chamber for reciprocating the piston in a downward axial direction; a body structure including a generally cylindrical body having a first end connected to the base and a second end opposite the first end, a center section located between the ends, and an interior chamber between the first end and the center section which defines a dry circuit cavity; a spring retainer located within the interior chamber; and a two-sided circuit card which includes a variable resistor circuit on one side and a control on/off switch on the other side.

In the preferred embodiment, the rolling diaphragm includes a lip extending circumferentially which mates with a groove located within the base structure and is operable to assure that the rolling diaphragm stays centered within the base structure.

A first alternative embodiment for the rolling diaphragm and for the base structure is a grooveless base structure and a rolling diaphragm without a peripheral lip. In this embodiment, the outer perimeter of the diaphragm is positioned on an annular portion of the base structure and is sandwiched between a gasket also positioned on the annular portion of the base structure and a corresponding annular portion on the body structure. One of the benefits here being that the rolling diaphragm and the base structure may be made with less costs because there is no groove to contend with.

A second form of the present invention is provided where a unique method of assembly of an oil pressure sender unit is presented. This second preferred form is comprised of the steps of: providing a base structure, a damper plug, a rolling diaphragm, a piston, a spring, a retainer washer, a body structure, and a circuit card; inserting a damper plug into a bore of the base structure; centrally positioning the rolling diaphragm on the base structure; locating the piston upon the rolling diaphragm; positioning the spring against the piston; inverting the body structure so that its dry circuit cavity is extending in an upward direction; applying an adhesive to the perimeter of the circuit card and inserting the circuit card within the channels of the body structure; placing the retainer washer on top of the spring; and inverting the body structure and centrally positioning the body structure on the base structure and securing the same together. Before the adhesive sets and permanently fixes the circuit card to the channel of the body structure, the oil pressure sender unit must be calibrated which may be accomplished by moving the circuit card in a downwardly axial direction until continuity is made with the wiper structures. The oil pressure sender unit is considered calibrated once there is zero resistance output at zero PSI.

These and other aspects, objects and advantages of the present invention will be further understood by examining the preferred embodiments of the present invention illustrated in the drawings and by studying the detailed description and claims found below.

BRIEF DESCRIPTION OF THE DRAWINGS

FIG. 2 is a top plan view of the oil pressure sender unit of the present invention, illustrating the location of the electrical connector terminals in the sender body;

FIG. 3 is an enlarged top plan view taken along line 3—3 of FIG. 1, showing the damper plug inserted within the oil inlet port;

FIG. 4 is an enlarged top plan view taken along line 4—4 of FIG. 1, showing the damper plug positioned within the enlarged bore of the oil inlet port;

FIG. 5 is an enlarged partial perspective view of FIG. 1, showing the circuit card and the sender housing as well as the retainer clips which are molded within the housing;

FIG. 6 is an enlarged side cross-sectional view taken along line 6—6 of FIG. 1, showing the oil pressure sender base and the sender body which houses the rolling wiper diaphragm, piston and other internal components;

FIG. 7 is an enlarged side cross-sectional view of FIG. 1, showing an alternative embodiment piston and rolling diaphragm connected to an alternative base;

FIG. 8 is an enlarged side view of the first side of the ceramic card, showing the variable resistor circuitry; and FIG. 9 is an enlarged side view of the second side of the ceramic card, showing the on/off switch circuitry.

DETAILED DESCRIPTION OF THE PREFERRED EMBODIMENT

Figure 1:
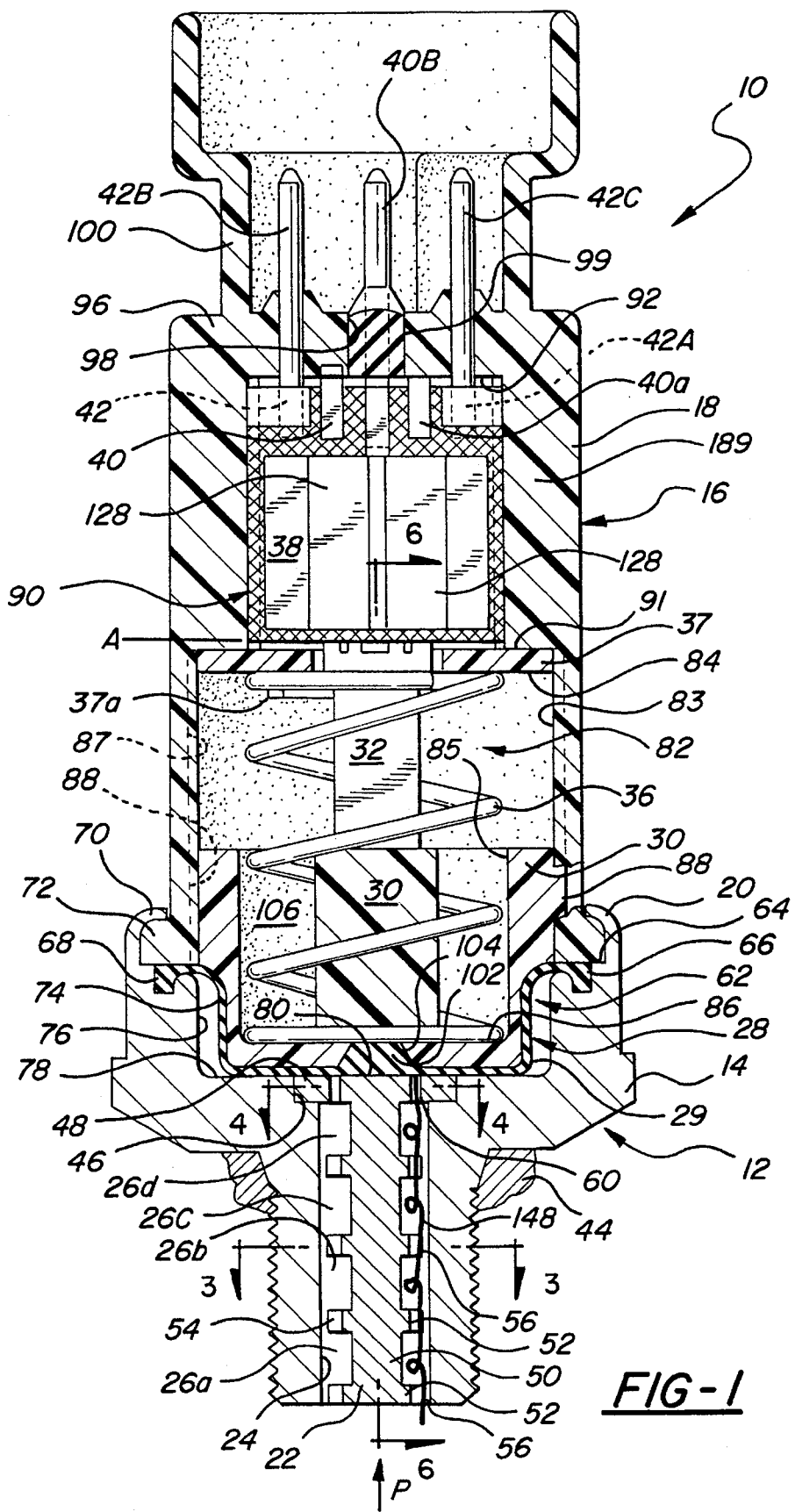
FIG. 1 is a side cross-sectional view taken along line 1—1 of FIG. 2, showing the configuration of the sender base, sender body, diaphragm, piston, circuitry and dampener plug.

An oil pressure sender unit 10, as shown in FIGS. 1 and 2, is provided with a sender base structure 12 having a metal base 14 and a sender body structure 16 preferably having a plastic body 18 that is secured to the base 14 by a crimped edge 20. The oil pressure sender unit 10 further includes interior components such as a damper plug 22 that is recessed within a fluid inlet passageway or bore 24 which together defines a plurality of stacked volume chambers 26a–26d, a rolling diaphragm assembly 28 which includes a reinforced diaphragm 29, a piston 30 which has integrally molded thereto contacts 32 and 34, a spring 36 that partially nests within the piston 30, a retainer washer 37 that provides an upper surface for the spring 36 to bias against, and a circuit card 38 which inserts into two pairs of clips 40, 40a and 42, 42a that are preferably integrally molded to the body 18. The clips 40, 40a, 42 and 42a are electrical extensions of connector pins 40b, 40c, 42b and 42c that extend up through and out of the body structure 16.

The oil pressure sender base structure 12 has at its base, the fluid inlet passageway 24 that receives pressurized fluid in the direction indicated by arrow P. The source of the pressure P may be from an oil inlet line (not shown) or by threading the base of the oil pressure sender unit 10 into the block 44 of the automotive engine. It will be appreciated that the present invention may be employed wherever it is desirable to sense fluid pressure.

The base structure 12 further includes an enlarged bore 46 which receives a large diameter portion 48 of the damper plug 22. Thus, this design allows the damper plug 22 to be recessed within bore 24 which together defines a plurality of stacked volume chambers 26a–26d which control the fluid pulsations by flattening out the peak high pressurized oil pulsations that tend to cause rapid repeated reciprocal modulation of the rolling diaphragm assembly 28.

As best illustrated in FIGS. 1 and 3, the damper plug 22 has an axially extending central body portion 50 which preferably has a plurality of spaced apart flanges 52, each of which having recesses or grooves 54 in an outer perimeter 56. It is preferable that each flange be provided with a plurality of spaced apart grooves 54 which are actually notches within the perimeter 56 and allow for additional flow area for fluid to pass through. Thus, fluid is allowed to pass through the groove 54 to each adjacent fluid chamber 26a–26d. The spaced apart stacked volume chambers 26a–26d provide areas for the fluid to accumulate prior to being delivered to the adjacent fluid chamber. Because of this design, high frequency pulsating oil first enters volume chamber 26a where it then begins to level out the intensity of the pulsations. Subsequently, the oil progresses through the remaining fluid volume chambers 26b–26d. The oil pulsations are substantially eliminated by the time a particular volume of oil reaches chamber 26d.

Referring to FIGS. 1 and 4, the damper plug 22 further has, at its enlarged diameter 48, a plurality of spaced-apart through-holes or outlet ports 60 which deliver a smooth continuous volume of pressurized fluid to the underside of the rolling diaphragm 29 and to the oil pressure cavity 62. The plug 22 is preferably snapped into the base 24 and is preferably made of the same reinforced plastic material that the body 18 is made of. It will be appreciated that the plug 22 may be made of other materials.

Referring again to FIG. 1, the base structure 12 further includes an annular ledge 64 that has a groove 66 formed therein that extends a full 360°. The groove 66 is operable to receive a lip 68 located on the circumference of the rolling diaphragm 29 which aids in centering and securing the diaphragm 29 to the base structure 14. This design of providing a groove in the base 14 and a lip on the diaphragm 29 further enhances the assembly process and minimizes any human errors that may occur while trying to center the diaphragm relative to the base structure 14.

The base structure 12 is preferably made out of steel, or other metal, so that it may be provided with an upper portion 70 that has a thin wall that is capable of being crimped over and secured against a corresponding lower lip or flange 72 which is an integral member of the body 18. By sandwiching this annular flange 72 between the upper portion 70 and the annular ledge 64, the lip 68 of the rolling diaphragm 29 is secured in place as well as the entire body structure 16 is held in place and prevented from axial or radial movement. Because the flange 72 is pressed directly against and rests on annular ledge 64, the diaphragm's lip 68 is not crushed which is an improvement over conventional designs and further enhances the life of the sender unit 10. This design essentially incorporates a crimp-stop which prevents diaphragm crush.

The oil pressure cavity 62 is a wet cavity that is defined by the outer perimeter 74 of the rolling diaphragm 29, the axially extending inner wall 76 of the base 14, the horizontal wall 78 of the base 14 and the top surface 80 of the damper plug 22. The volume of the oil pressure cavity 62 may change in accordance with the volume of oil delivered through the oil inlet passageway 24. The circuit cavity 82 is a dry cavity which is defined by axially extending cylindrical walls 83 of the body 18, the lower surface 84 of the retainer washer, axially extending cylindrical wall 85 and horizontal wall 86 of the piston 30. It is important that the integrity of the circuit cavity 82 be maintained in order to prevent any foreign materials from contaminating the contacts 32 and 34 as well as the circuit card 38. Also, the connector clips 40, 40A, 42 and 42A must stay clean in order to maintain continuity with the circuit card 38.

Referring now to FIGS. 1 and 5, the sender body structure 16 is preferably made of a molded plastic which is resistant to oils, gasoline or other solvents that are generally found in the engine compartment of an automobile. The body structure 16 further includes a pair of axially extending channels 87 recessed within wall 83 and extending the entire length of the dry circuit cavity 82. These channels 87 act as a guide for a pair of tabs 88 (shown in the break-away section of FIG. 1) of the piston 30 to ride within as the piston 30 axially reciprocates during engine operation. The tabs 88 are preferably integral with and located on opposite sides from one another (in the top plan view) at the outer perimeter of the piston 30 and are of sufficient dimension to slide freely within the channels 87. The tabs 88 prevent the piston 30 from rotating within the body 18 while reciprocating. Because the body structure 16 is made of plastic, it is preferable to mold the channels 87 into the body structure 16. Such a piston 30 is referred to as a groove-guided piston 30.

A thickened wall 89 extends axially and further defines a circuit card area 90 along with surface 91 that receives the retainer washer 37 and the lower surface 92. The area 90 is an extension of dry cavity 82. Also provided is a pair of axially extending channels 93 capable of receiving and holding in place the circuit card 38. In order to permanently affix the circuit card 38 to the channels 93, an adhesive (shown by dots), preferably DURO-QUICK, a gel by LOC-TITE, should be applied to the outer axially extending edges 94 of the circuit card 38 prior to the oil pressure sender unit 10 being completely assembled. A discussion of this calibration process will be presented later. The circuit card 38 is further held in place by electrical contact clips 40, 40A, 42 and 42A which sandwich the thickened portion 95 of the circuit card 38 and further provides the function of completing the resistor circuit and on/off switch circuit.

The sender body 18 further includes a horizontally extending thickened wall portion 96 that has a bore 98 extending axially therethrough and is of sufficient dimension to receive a plug 99 (see FIG. 1) preferably made of gortex material (e.g. stretch polytetrafluroethylene). The plug 99 is inserted into bore 98 after the calibration process is completed and prevents moisture from entering the dry circuit cavity 82, while allowing the cavity 82 to breath without subjecting the electrical contacts and members located within the cavity 82 to corrosion inducing moisture. It will be appreciated that a different type of plug may be employed that would entirely seal off the circuit cavity 82.

The body structure 16 further includes an axially extending configured wall 100 that is integral with the thickened horizontal wall portion 96 and is further configured in order to provide a connecting area for a conventional connector plug (not shown) to be connected thereto. It will be appreciated that a conventional male connector plug may be used and connected to the sender body 16 and its terminals 40B, 40C, 42B and 42C.

The rolling diaphragm 29 is preferably made out of a cloth weave having vulcanized rubber on both sides that creates an impermeable barrier for fluids to be transferred through. The outer layers of rubber are preferably made of polyepichlorohydrine which has a long flex life, is operable between the temperature ranges of 40° F. and 300° F., does not out-gas and is not effected by oil based gases/fluids. The diaphragm 29 is pliable and has an integral center raised portion 102 that mates with a corresponding recessed portion 104 of the motion piston 30. This self-centering design and means creates a locking fit between the motion piston 30 and the rolling diaphragm 29 and further maintains the piston centered within the body structure 16. This assures that the contacts 32 and 34 are aligned properly with the circuit card 38.

Referring now to FIGS. 1 and 6, the piston 30 is preferably made of plastic material that is resistant to oils and other contaminants and is preferably a groove-guided motion piston. The piston 30 is designed to conform with the shape of the diaphragm 29 and includes a recess 106 that receives spring member 36 which biases against the horizontal wall 86 of the piston 30. Integrally molded within the center portion 108 of the piston 30 is preferably a pair of trifurcated copper contacts 32 and 34 made of Olin C7025 material. It will be appreciated that a pair of bifurcated contacts could also be used or illustrated in FIG. 1.

Each contact 32 and 34 is constructed the same way and includes a left arm 109 and a right arm 110 which contacts a left column 111 and a right column 112, respectively, of either a resistant material 113 or a conductive material 114, depending upon which side of the circuit card 38 you are facing. By using trifurcated contacts, wiper to circuit card integrity is maintained during vibration and rotational forces during operation. At the end of each electrical contact 32 and 34, a bent portion 115 is provided which assures contact against the resistive material 113 and the conductive material 114 of the circuit card 38. A self-cleaning function is created because of this design which prevents the build-up of contaminants both on the inner surfaces of the contacts 32 and 34 as well as on the outer surfaces of resistive material 113 and the conductive material 114. This is demonstrated by the illustration (FIG. 6) where contact element 32' is shown in a position where the detent 115 cradles between resistive segments or fingers 116a and 116b. As the piston 30 reciprocates in an upwardly and downwardly direction, the contact 32 rides up upon the top or outer surface of either finger 116a or 116b, depending upon the direction of travel, and then pops back down into the next cradle portion and so forth. This action causes the inner surface (i.e., the surface facing the card 38) of the contact 32 to clean each time the contact reciprocates.

Referring now to FIGS. 5, 6 and 8, a preferred form of the circuit card 38 is illustrated having resistor material 113 positioned on a ceramic substrate circuit card such that a comb-like configuration 118 is created by each column 111 and 112. This comb-like configuration 118 could also be considered a stair-step configuration which is designed to increase the resistance area and thus the summed equivalence of resistance as the contact 32 moves in an upwardly direction. By providing this comb-like configuration, the detent 115 is allowed to ride upon a single finger 116a and then nest between the next finger 116b and 116a. This configuration enhances the wearability of the resistor material. The type of finger material preferably is a palladium silver alloy which may be deposited on the surface of the resistance material which, in turn, is deposited on the ceramic substrate circuit card 38 by conventional methods such as acid-etching or by layered masking techniques. The resistor material 113 is represented schematically by the speckles located on the surface of the ceramic substrate (see FIG. 8).

The ceramic card 38 is very porous which is best for heat dissipation. This card and contact design is unique in that it is a split resistor type set-up, i.e. arms 109 and 110 contacting columns 111 and 112, which assists in the dissipation of heat emitted by the oil. The area indicated by the letter Z (see FIG. 8) must be a zero resistant material and preferably, is made of a silver/paladium having superior wear resistance.

FIG. 9 represents the second side of the circuit card where the on/off switch circuitry 120 is presented. It is preferred that a conductive material 114 be deposited upon the ceramic substrate surface 122 in order to define a pair of separated strips or columns 124 and 126 of conductive material. During engine operation, the contact 34 rides upon the strips 124 and 126 of conductive material and places the switch circuit 120 in a closed status. Once in a closed status, the auxiliary device, for example a fuel pump, may be energized. It will be appreciated that any type of conductive material may be used as long as it has high wearability properties which are required due to the constant wearing caused by the contact 34.

It will be appreciated that an alternative arrangement to the comb-like design of the circuit card 38 may be provided where a straight bar linear strip 128 of resistive material may be provided and deposited upon a ceramic substrate of the circuit card 38 as shown by the solid lines in FIG. 1. This alternative arrangement, however, would not provide the self-cleaning effect that is so very advantageous and clearly represented by the comb-like configuration 118 in FIGS. 5 and 8.

The type of spring 36 that must be used depends greatly upon the oil pressure the oil pressure sender unit 10 will be subjected to. It is important that the spring 36 have sufficient resilient capacity to bias the rolling diaphragm 29 in a downward direction during operation as well as being capable of performing over the lifetime of the oil pressure sender unit 10 which is preferably equivalent to the life of the engine. Thus, the spring must be calibrated in order to meet specific design requirements. The retainer 37 acts as a washer and locator for spring 36 by providing a downwardly extending member 37a which receives the inner diameter of the spring 36. This assures that the upper end of the spring 36 does not walk around during operation. The spring design includes manufacturing improvements to eliminate fracture during flex and compression with applied pressure. Such manufacturing improvements may include having the spring shot peened which will relieve stresses.

An alternative embodiment oil pressure sender unit 130 is illustrated in FIG. 7 and is comprised of a novel base 132, rolling diaphragm 134 and piston 136 as well as the other key components of the sender unit that are presented in the FIG. 1 embodiment. Where possible, like numbers will be used to reference previously discussed elements.

The base 132 is preferably made of metal and is of the grooveless design which therefore requires a new reinforced rolling diaphragm 134 configuration. As discussed above, the base 132 includes a fluid inlet passageway 24 and an enlarged upper bore 46 that is capable of having a damper plug 22 press fit within it. The base 132 further includes an annular portion 138 that has an annular piece of gasket material 140 positioned on it that acts as a cushion and a protectant for the diaphragm 134. The base 132 further includes an axially extending end wall portion 142 that is shown crimped (in one instance) on flange 72 of the oil pressure sender unit body 18 (partially shown). By crimping the body 18 against the base 132, the diaphragm 134 and the gasket material 140 are essentially sandwiched and thus held in place and prevented from moving This method provides ease of manufacture and can withstand variable assembly pressures.

The piston 136 is a groove-guided piston similar to the piston 30 shown in FIG. 1, however, it is configured differently which is evident by the frustum-shaped lower portion 144. The piston 136 is configured like this so that it more nearly conforms with the configuration of the diaphragm 134 which has been changed because of the mounting arrangement of the diaphragm 134. The piston 136 is further provided with a pair of tabs 146 (shown hidden on the left side and shown solid in the partial break-away section on the right side) that slide within groove or channel 91 of the sender body 18. These tabs 146 allow the piston 136 to track in a substantially vertical direction which assists in maintaining that the bifurcated contacts 32 and 34 properly maintain contact with the resistance and conductive material located on the circuit card 38. The remaining components of the alternative embodiment sender unit 130 include the body structure 16 the spring 36, the washer 37, and the card 38 (all discussed above).

The method of assembly of the oil pressure sender unit 10 is unique in design and offers economies of scale due to its simplistic design and minimum number of components. It is believed that the method of assembly of the oil pressure sender unit 10 and 130 will enhance the manufacturing process by simplifying the assembly process. The method of assembling the oil pressure unit 10 will now be discussed.

The base 14 has a damper plug 22 press-fit within fluid passageway 24 such that the enlarged diameter 48 is properly recessed within bore 46. The next step may occur by at least two methods. First, a rolling diaphragm assembly 28 could be a pre-assembled component which would include the rolling diaphragm 29, the piston 30 and the spring 36 already being pre-assembled prior to the final assembly process. The alternative here would be to individually, during the primary assembly process, stack each of these components upon one another in their appropriate positions. For example purposes, the later single step method will be discussed in detail.

The rolling diaphragm 29 will next be centered within the base 14 by properly snapping the lip 68 of the diaphragm within groove 66. By properly snapping the lip 68 within the groove 66, the diaphragm 29 becomes automatically centered within the base structure 14. Next, the piston 30 must be properly placed upon the diaphragm 29 such that the recess 104 of the piston 30 and the raised member 102 of the diaphragm properly engage or mate with one another. This last step helps properly assure that the piston is centered relative to the base 14 and the body 16. The next step requires inserting the spring 36 within the recess 106 of the piston 30 and then locating the retainer washer 37 at the top end of the spring.

The next step requires reverting the body 16 such that the dry circuit cavity 82 is positioned in an upward direction. Next, an adhesive, preferably a LOCTITE gel, must be applied to the outer edges 94 of the circuit card. The circuit card 38 must then be inserted within the channels 93 in the manner illustrated in FIG. 5. It is important to make certain that the circuit card is clean and that all of the contact terminals within the circuit cavity are clean prior to the assembly process. Furthermore, it is important to make sure that the circuit card 38 is properly advanced toward the end wall 92 of the circuit card area 90 prior to the calibration process.

The next step requires reverting the body 16 and placing the body 16 down over the piston 30. It is important, at this time, to make certain that the channels 87 of the body 16 are properly aligned with the tabs 88 of the piston 30. Once these elements are properly aligned, the body 16 may be easily pressed down onto the piston to the point where flange 72 of the body 16 properly rests upon annular area 64 of the base 14. Next, the thin-walled portion 70 must be crimped which ultimately results in the body 16 and the base 14 being locked together and prevented from any axial or radial displacement relative to one another.

It will be appreciated that the alternative embodiment illustrated in FIG. 7 will be assembled in substantially the same process as discussed above. However, it is important to note that the diaphragm 134 and gasket 140 must be centered within the bore 132 before the body 18 is crimped to the base 132.

A discussion of the method of calibration of the oil pressure sender unit 10 will now be presented. It is important to note that this calibration step must take place prior to the circuit card adhesive becoming completely set-up. The rate at which the adhesive sets up may be controlled by changing the various properties of the adhesive material.

The first step in calibrating the oil pressure sender unit 10 preferably requires that the oil pressure sender unit 10 be entirely assembled, excluding the step of inserting the gortex plug 98 within passageway 99. It is important to note that the circuit card 38 should be pushed clear against end wall 92 (see FIG. 5) prior to the body 18 being crimped to the base 14. Next, an ammeter must be placed across terminals 40 and 40A in order to monitor the continuity of the circuit. At this point, there should be no continuity because contact 32 has not yet made contact with the resistant material 113. In order to make the circuit card 38 engage the contact 32, a rod 152 may be inserted within bore 98 and pushed downward against the top edge 154 of the circuit card 38 until continuity is indicated by the ammeter. Once continuity is indicated, the oil pressure sender unit 10 is considered calibrated where there is zero oil pressure at zero ohms of resistance. FIG. 8 clearly illustrates the positioning of the contact 32 at point A which is at the instant in time where there is zero ohms of resistance at zero oil pressure.

It is important to note that this calibration process must take place during a time period in which the adhesive is in a gelled state. Also, it is important to make certain that once the circuit card 38 has been properly positioned and thus the sender unit 10 properly calibrated, that the circuit card 38 be allowed to set and bond to the channels 93 of the body 18. Once this has occurred, the circuit card 38 will permanently stay in place and the sender unit 10 should never require recalibration. Following calibration, the ammeter can be removed and the gortex plug 99 may be inserted within bore 98. The oil pressure sender unit 10 is now ready for use. It will be appreciated that the sender unit 130 may be calibrated by using the same process.

The operation of the oil pressure sender unit 10 will now be discussed. Focusing primarily on FIG. 1, as oil under pressure P enters the fluid inlet passageway 24, it first enters volume chamber 26a and follows a path as defined schematically by line 148. The high pressurized oil is then delivered to volume chambers 26b through 26d, respectively, which results in the high frequency pulsations being substantially reduced such that a smoother continuous flow of fluid is provided to oil pressure cavity 62 and to the underside of the diaphragm 29. This results in the rolling diaphragm assembly 28 operating in a much more smoother or gradual manner which results in a smooth and continuous analog signal being output by the sender unit 10.

Prior to the initial start-up of the engine, there is zero pressure and zero resistance. At this point the top point 156 of the contact 32 is positioned at point A (see FIGS. 1, 6 and 8). As the engine rpm increases, a smooth steady stream of fluid is introduced into the oil pressure cavity 62 which consequently moves the rolling diaphragm assembly 28 in the direction of arrow P. At approximately 5 psi, the contacts 32 and 34 have travelled vertically approximately 0.025 inches and there is approximately 20 ohms of resistance. This is indicated by line B (FIG. 8). At this point and time, the contact 34 now makes contact with the on/off switch circuitry 120 and thereby completes the circuit and sends a signal to an auxiliary device, for example a fuel pump, so that said device is energized and will operate continuously until an oil pressure of less than 5 psi is sensed.

Referring to FIG. 9, to more clearly illustrate how the electrical switch 120 is activated, the contact 34 is shown at position B where it first completes the circuit and energizes the auxiliary device. This is accomplished by current being delivered to and through electrical clip 42, along path 158 which is part of strip 124, and then through arm 109 of the trifurcated contact 34, across the metallic contact 34 to the other arm 110 and then along the path 160 of strip 126 and then back out through connector terminal 42A. Thus, as long as contact 34 maintains its connection with the conductive strips 124 and 126, the auxiliary device will continue to be energized.

Referring back to FIG. 8, to more clearly understand how the resistor circuit operates, the ends 156 of contact 32 is illustrated making contact with the resistive material at position A. As the contact begins to move upwardly, the resistance increases linearly which results in a corresponding analog output signal that indicates an increase in oil pressure. The following table illustrates the resistance and oil pressure changes as the contact 32 walks upwardly over a series of points A through F (see FIG. 8). It will be appreciated that these values may vary depending on various modifications to this invention.

resistance. It will be appreciated that as the oil pressure changes during engine operation, the positioning of the contact 32 will change accordingly and thus varying outputs of current will be achieved because the linear distance between points A and F will vary. At the maximum oil pressure operating conditions, the contact 32 will be in the proximity of point F. This position represents the maximum resistance and thus the minimum current output for the circuity because of the increase in voltage drop across the resistor between points A and F.

Those skilled in the art will appreciate that the present invention provides a low-cost, high-pressure reliability oil pressure sender unit that is particularly well-suited for use in automotive applications as well as a number of other applications including, but not limited too, marine engines, agricultural machinery, construction machinery, engines for power generators, pumps and the like. Essentially, the present invention may be well-suited for any application where it is desirable to have a low-cost, highly reliable, fluid sensor device that has an extended life.

It should further be appreciated that still other variations to the preferred embodiments to the present invention, beyond those mentioned above, are possible. Accordingly, it is to be understood that the protection sought and to be afforded hereby should be deemed to extend to the subject matter defined by the claims below, including all fair equivalents thereof.

What is claimed is:

1. An oil pressure sender unit for use in an automotive vehicle, the sender unit comprising:

a base structure including a generally cylindrical base having an open end and a closed end and a cylindrical interior chamber between the two ends, and an oil inlet chamber extending from the open end to the interior chamber;

a damper plug positioned within said oil inlet chamber for smoothing inlet oil pulsations;

a rolling diaphragm centrally positioned within the interior chamber of said base structure;

a piston having a wiper structure secured to said piston, said piston being positioned on said base;

a spring positioned within said interior chamber for biasing said piston;

a body structure including a generally cylindrical body having a first end connected to said base and a second end opposite said first end, a center section located between said ends, and an interior chamber between the first end and the center section;

a spring retainer located adjacent said body structure; and

| REFERENCE POINT | APPROXIMATE DISTANCE TRAVELLED IN INCHES | APPROXIMATE OIL PRESSURE (PSI) | APPROXIMATE RESISTANCE (ohms) |
| --- | --- | --- | --- |
| A | 0 | 0 | 0 |
| B | .050 | 5 | 20 |
| C | .100 | 20 | 22–44 |
| D | .266 | 40 | 38–40 |
| E | .347 | 68 | 55–57 |
| F | .385 | 80 | 72–75 |

Thus, at point F, maximum oil pressure is sensed by the diaphragm which thus causes contact 32 to traverse the greatest distance along the circuit card 38 and produce an analog signal indicative of approximately 72–75 ohms of a circuit card structure including a variable resistor circuit and a control switch circuit.

2. The oil pressure sender unit as in claim 1, wherein the damper plug includes a plurality of stacked radially extending appendages, each appendage having a fluid passageway, said damper plug being operable to minimize high frequency oil pressure perturbations.

3. The oil pressure sender unit as in claim 1, wherein the card is formed of ceramic and has a resistive material affixed to one side of the card and a conductive material affixed to another side of the card, the card being operable to dissipate heat.

4. The oil pressure sender unit as in claim 1, wherein the body further includes terminals molded in said center section of the body, said terminals being operable to secure said card structure to said body.

5. A fluid pressure sensor unit comprising:
   a housing having a longitudinal axis, an interior chamber, and an inlet passageway having chambers for restricting oil flow;
   a diaphragm structure secured to said housing and located within the interior chamber and operable to reciprocate as the oil pressure modulates with engine speed; and
   a circuit card secured to said housing and having a resistor circuit on one side and a switch circuit on another side, said resistor circuit operable to produce an analog signal indicative of the oil pressure generated by said engine speed, said switch circuit operable to produce an on-off signal.

6. The fluid pressure sensor unit as in claim 5, further comprising:
   a housing including a base structure and a body structure, the base structure including a generally cylindrical base having an open end and a closed end and a cylindrical interior chamber between the two ends, and an oil inlet chamber extending from the open end to the interior chamber, the body structure including a generally cylindrical body having a first end connected to said base and a second end opposite said first end, a center section located between said first end and said second end, and an interior chamber between the first end and the center section;
   a damper plug positioned within said oil inlet chamber for regulating inlet oil pulsations;
   a piston having a wiper structure molded to said piston, said piston being positioned on said diaphragm; and
   a spring positioned within said interior chamber for biasing said piston.

7. The fluid pressure sensor unit as in claim 5 wherein the diaphragm includes a first outer layer made of rubber, an inner layer bonded with the first outer layer and made of a woven material and a second outer layer made of rubber that is bonded to the inner layer.

8. The fluid pressure sensor unit as in claim 5 wherein the diaphragm includes a piston self-centering means operable to center a piston.

9. The sensor unit as in claim 5, wherein the diaphragm includes a lip on its circumference that firmly positions said diaphragm relative to a groove formed within the housing.

10. The fluid pressure sensor unit as in claim 5 wherein the housing includes a base and a body, the base has an annular mounting area and an upturned wall, the body has a radially extending flange, the upturned wall is crimped against the flange and the diaphragm is secured between the base and the body without smashing the diaphragm.

11. The fluid pressure sensor unit as in claim 5, further comprising a plug inserted into the inlet passageway, the passageway and the plug together define a plurality of fluid volume chambers operable to control fluid pulsations.

12. The sensor unit as in claim 6, wherein the center section of said body has an air passageway extending therethrough, said sensor unit further comprising a vent plug located within said air passageway.

13. The sensor unit as in claim 5, further comprising a damper plug positioned within the inlet passageway which together define chambers that are operable to deliver smooth fluid flow to an underside of the diaphragm.

14. The sensor unit as in claim 5, further comprising a pair of wiper structures integrally molded to a piston.

15. The sensor unit as in claim 5, wherein the interior chamber of said housing includes a longitudinally extending slot operable to receive said circuit card.

16. A fluid pressure sender unit for use in automotive applications to produce an analog signal which varies in accordance with sensed fluid pressure, the sender unit comprising:
   (a) a housing structure having an internal dry circuit cavity, a fluid cavity that receives pressurized fluid and an inlet passage that supplies fluid to the fluid cavity;
   (b) a rolling diaphragm assembly including a reinforced diaphragm centrally positioned within the housing, a piston centrally positioned with the diaphragm and a biasing member that biases the diaphragm towards the inlet passage, the diaphragm being operable to separate said housing structure into the dry cavity and the fluid cavity; and
   (c) an electrical circuit for producing an analog signal indicative of the changing fluid pressure applied to the fluid cavity, said electrical circuit including a two-sided circuit card having resistive material affixed to a first side and a conductive material affixed to a second side.

17. The fluid pressure sender unit as in claim 16, wherein the electrical circuit includes:
   (a) a plurality of electrical contacts molded to the housing structure and operable to engage the circuit card,
   (b) a first wiper structure connected to the piston and moveable in close proximity to the first side of the circuit card to produce variations in the analog signal in proportion to the mechanical displacement of the rolling diaphragm assembly, and
   (c) a second wiper structure connected to the piston and moveable in close proximity to the second side of the circuit card to produce a continuous output electric signal once a predetermined pressure value has been sensed.

18. The fluid pressure sender unit as in claim 16, wherein the piston is a groove-guided piston operable to reciprocate axially within said housing.

19. The fluid pressure sender unit as in claim 16 further comprising an anti-modulating structure operable to control fluid pulsations and minimize wear on the electrical circuit.

20. The fluid pressure sender unit as in claim 16 further comprising a crimp-stop operable to prevent crushing of the diaphragm.

* * * * *